United States Patent
Tanaka

(10) Patent No.: US 6,800,320 B1
(45) Date of Patent: Oct. 5, 2004

(54) CREAMY ICE CREAM PRODUCTS CONTAINING SOY-MILK AND POTATO AS THE MAIN COMPONENTS AND PROCESS FOR PRODUCING THE SAME

(75) Inventor: Hideharu Tanaka, Shizuoka (JP)

(73) Assignee: Sun Honest Co., Ltd., Shizuoka (JP)

( * ) Notice: Subject to any disclaimer, the term of this patent is extended or adjusted under 35 U.S.C. 154(b) by 0 days.

(21) Appl. No.: 10/049,236

(22) PCT Filed: May 22, 2000

(86) PCT No.: PCT/JP00/03263

§ 371 (c)(1),
(2), (4) Date: Feb. 11, 2002

(87) PCT Pub. No.: WO01/11985

PCT Pub. Date: Feb. 22, 2001

(30) Foreign Application Priority Data

Aug. 11, 1999 (JP) .......................................... 11/228067

(51) Int. Cl.⁷ .............................. A23G 9/02; A23G 9/04
(52) U.S. Cl. ....................... 426/658; 426/634; 426/580; 426/637
(58) Field of Search ................................ 426/634, 580, 426/637, 658

(56) References Cited

U.S. PATENT DOCUMENTS

| | | | |
|---|---|---|---|
| 4,064,277 A | * | 12/1977 | Yokotsuka et al. |
| 4,084,010 A | * | 4/1978 | Takemoto et al. |
| 4,143,172 A | * | 3/1979 | Mitchell et al. |
| 4,562,081 A | * | 12/1985 | Buttermann, III |
| 4,675,200 A | * | 6/1987 | Serpelloni et al. |
| 4,906,482 A | * | 3/1990 | Zemel et al. |
| 5,945,151 A | * | 8/1999 | Sato et al. |
| 6,022,568 A | * | 2/2000 | Lesens et al. |
| 6,316,043 B1 | * | 11/2001 | Tsumura et al. |

FOREIGN PATENT DOCUMENTS

| | | | |
|---|---|---|---|
| JP | 58-212749 | * | 12/1983 |
| JP | 59-227249 | | 12/1984 |
| JP | 61-96953 | * | 5/1986 |
| JP | 62-198358 | | 9/1987 |
| JP | 4-152848 | * | 5/1992 |
| JP | 6-14722 | | 1/1994 |
| JP | 8-182468 | * | 7/1996 |
| JP | 11-103783 | | 4/1999 |
| JP | 11-137181 | | 5/1999 |
| JP | 2001-252022 | * | 9/2001 |

OTHER PUBLICATIONS

Shokuhin Kogyo, vol. 29, No. 16, Aug. 1986, pp. 46–48.

* cited by examiner

Primary Examiner—Anthony Weier
(74) Attorney, Agent, or Firm—Young & Thompson

(57) ABSTRACT

Ice creams having a creamy texture without any soybean odor like ice cream are provided by using soybean, without any use of dairy products or chemical auxiliaries, so the ice creams can be ingested by persons who cannot enjoy previous ice creams with addition of dairy products or chemical auxiliaries, due to the delicate health or milk allergy. Novel ice creams are provided, containing as the essential main components, soymilk and at least one species of potatoes. Use of at least one species of potatoes as one of the main components makes it possible to provide an ice cream product showing a smooth and creamy texture comparable to conventional ice creams and having no soybean odor.

11 Claims, No Drawings

CREAMY ICE CREAM PRODUCTS CONTAINING SOY-MILK AND POTATO AS THE MAIN COMPONENTS AND PROCESS FOR PRODUCING THE SAME

TECHNICAL FIELD

The present invention relates to ice creams and a method for producing the same. More specifically, the invention relates to creamy ice creams from soymilk and potatoes as the main raw materials, with absolute no use of dairy products, and a method for producing the same.

BACKGROUND OF THE INVENTION

Ice cream widely ingested as one representative of ice creams contains dairy products according to the merchandise standards and can retain a creamy texture via the content of dairy products. Various types of ice cream have been available, and attention is now focused on ice creams using soybean. The content of soybean therein enables the intake of nutritious elements never ingested from dairy products, for example lecithin, calcium, potassium, vitamin B1, vitamin B2, iron, protein and isoflavone, so that the resulting ice creams are suitable for current health-conscious need.

Dairy products or chemical auxiliaries have been essential for ice creams using soybean. In case of no content of dairy products, delicious ice creams with a creamy texture but without soybean odor have never been produced. Even in case of ice creams using soybean, the ice creams have merely soybean odor and a hard sandy rough texture, when the ice creams contain no dairy products or chemical auxiliaries. Because of such reasons, the content of dairy products or chemical auxiliaries for food, such as emulsifiers, has been the state of the art.

However, the content of dairy products or chemical auxiliaries causes the following problems. In other words, persons in delicate health or with milk allergy could not eat delicious ice creams with addition of dairy products or chemical auxiliaries.

It is a purpose of the invention to provide ice creams with a creamy texture like ice cream but without any soybean odor, by using soybean, absolutely without use of dairy products or chemical auxiliaries, so persons incapable of ingesting previous ice creams with addition of dairy products or chemical auxiliaries due to their delicate health or milk allergy can ingest the resulting ice creams.

DISCLOSURE OF THE INVENTION

The invention provides novel ice creams containing soymilk and at least one species of potatoes as the essential main products. The content of at least one species of potatoes as one of the main products enabled the achievement of a smooth and creamy texture like ice cream in the absence of any soybean odor.

With absolutely no use of dairy products or chemical auxiliaries for food, such as emulsifiers, novel ice creams tasting smooth and creamy and having a taste and a flavor totally without any soybean odor, like ice cream, can be recovered from the main raw materials soybean and potatoes. Owing to absolutely no use of dairy products or chemical auxiliaries such as emulsifiers, the resulting novel ice creams of the invention can be ingested even by persons with milk allergy or in delicate health, who could never taste ice cream. Additionally because of no use of rice, persons with rice allergy can ingest the novel ice creams of the invention.

BEST MODE FOR CARRYING OUT THE INVENTION

The mode for carrying out the invention will be described in detail.

The invention provides novel ice creams with a taste and a flavor like the taste of ice cream, which can be produced from the main raw materials soybean and potatoes, with totally no use of dairy products or chemical auxiliaries for food, such as emulsifiers.

The novel ice creams contain soymilk and at least one species of potatoes as the essential main products.

In case that soymilk and a sweetener are contained as the main products, a smooth and creamy texture like ice cream can never be generated even if the crunching texture of sherbet can be yielded. Meanwhile, the content of at least one species of potatoes as one of the main products enabled the recovery of a smooth and creamy texture like ice cream.

Specific content ratios of the main products on a dry weight basis are 10 to 21 parts by weight of soymilk, 5 to 12.5 parts by weight of potatoes and 50 to 70 parts by weight of a sweetener, provided that the total solid content in the ice creams is defined 100 parts by weight.

As the potatoes, for example, sweet potato is preferable with no specific limitation. For example, Japanese yam and taro may satisfactorily be contained therein. Thermal treatment of sweet potato yields a spontaneous emulsifying effect due to the starch.

As the sweetener, various naturally occurring or artificial sweeteners can be used. Oligosaccharide maybe used as a preferable sweetener. In case of oligosaccharide is used, heating and agitation can decompose the sugar chain to increase the amount of dextrin, which incorporates substances causing soybean odor, thereby reducing effectively the fresh green odor of soymilk.

Further, at least one species of apple may satisfactorily be contained, together with potatoes such as sweet potato. Provided that the total solid content in the ice creams on a dry weight basis is defined 100 parts by weight, in this case, the following composition is the most preferable: soymilk at 10 to 21 parts by weight, sweet potato at 5 to 12.5 parts by weight, apple at one to 2 parts by weight and oligosaccharide at 20 to 40 parts by weight. Still further, the composition with the solid content in soymilk being about 14 to 15 parts by weight is the most preferable. The most preferable is the composition with oligosaccharide at 30 to 35 parts by weight.

By mixing apple together with potatoes such as sweet potato into other mix materials, to adjust the total solid content in the ice creams content to preferably 25% to 34%, more preferably 28% to 31%, a smooth and creamy texture like ice cream can be recovered, which has never been attained previously.

In case that rice is used instead of potatoes, a problem occurs such that the resulting product is not suitable for persons with rice allergy. In case that potatoes such as sweet potato are used, as in the present invention, even persons with rice allergy can ingest the resulting ice creams, while potatoes are healthy foodstuffs abundant in dietary fiber. As described above, further, potatoes, particularly sweet potato when heated exert a spontaneous emulsifying action due to the starch, so that a smooth and creamy texture like ice cream can be recovered.

More preferably, addition of additives from at least one species of fruit with sour taste as a raw material allows the exertion of the masking effect of soybean odor. For example, 100% Japanese apricot juice, lemon and apple may satisfactorily be used. Heating of the acids contained in such fruit along with soymilk causes protein modification, leading to the exertion of an emulsifying effect.

Other mix materials further include beet granulated sugar, isomerized sugar, apple pectin, coral, sesame seed oil or rapeseed oil.

Additionally, addition of antioxidants in vegetables or cereals, such as SOD or peptide or amino acid from fishes may possibly render the exertion of an effect as a so-called functional food.

Still further, the sweetener may satisfactorily be a naturally occurring or artificial sweetener with high calories, but a low-calorie sweetener such as momordicae fructus may also be used. As described above, the ice creams of the invention never contain any dairy product, so the ice creams are free of milk fat and with low calories.

Further, appropriate use of various vegetables such as sweet potato or ground green tea or cocoa or vanilla essence from natural origins permits the enjoyable taste of various flavors.

In accordance with the invention, thus, novel ice creams tasting smooth and creamy and having a taste and a flavor with no soybean odor like ice cream can be recovered from the raw materials soybean and potatoes, with absolutely no use of dairy products or chemical auxiliaries for food, such as emulsifiers. Owing to absolutely no use of dairy products or chemical auxiliaries such as emulsifiers, the resulting novel ice creams of the invention can be ingested even by persons with milk allergy or in delicate health, who could never taste ice cream. Additionally because of no use of rice, persons with rice allergy can ingest the novel ice creams of the invention.

As described above, further, all the materials used are beneficial for human bodies, so the smoothness and creamy texture is comparable to the previous ice cream as a dairy product. Still further, nutritious elements never ingested from dairy products, for example lecithin, calcium, potassium, vitamin B1, vitamin B2, iron, protein and isoflavone can be ingested from the resulting ice creams, so the ice creams are suitable for the current health-conscious need.

Still further, the invention provides a method for producing novel ice creams with a taste and a flavor like ice cream from the main raw materials soybean and potatoes, with totally no use of dairy products or chemical auxiliaries for food, such as emulsifiers.

For the method for producing the novel ice creams of the invention, the following steps are essential steps, while the other steps may appropriately be modified so as to create the intended flavor.

Specifically, the method for producing the novel ice creams of the invention includes as the essential steps, a step of purifying soymilk by squeezing or filtering out soybean juice, a step of kneading at least one species of potato powder with the solid of the soymilk for thermal treatment, a step of adding a sweetener and mix materials to the resulting mixture for heating and agitation and subsequently cooling and freezing the mixture.

For the reduction of soybean odor, preferably, soybean is boiled until water slops over or soybean is cooked without grinding to a fine size in water containing electrolytes or in alcohol and water; then, the juice is squeezed at a low pressure.

More preferably, sweet potato powder is used as at least one species of potato powder, while oligosaccharide is used as the sweetener. Sweet potato is preferable with no specific limitation. For example, Japanese yam and taro may satisfactorily be used. Sweet potato has the masking effect of soybean odor, while heating of sweet potato allows the exertion of a spontaneous emulsifying effect due to the starch.

As the sweetener, various naturally occurring or artificial sweeteners can be used. Oligosaccharide may be used as a preferable sweetener. In case of oligosaccharide is used, the sugar chain is decomposed via heating and agitation to increase the amount of dextrin, which incorporates substances causing soybean odor, thereby reducing effectively the fresh green odor of soymilk.

Further, at least one species of apple may satisfactorily be kneaded together with potatoes such as sweet potato into the solid of the soymilk, and in this case, blend ratios to the total solid of the ice creams on a dry weight basis are preferably 10 to 21% for soymilk, 5 to 12.5% for sweet potato powder, 1 to 2% of apple powder, and 20 to 40% of oligosaccharide. Further, the composition at a solid content of soymilk being about 11% is the most preferable. The composition of an oligosaccharide content of 30 to 35% is the most preferable.

The heating and agitation step after the addition of oligosaccharide as the sweetener is continued until the sugar chain is decomposed to increase the quantity of dextrin to incorporate the molecules causing soybean odor. The effect can be procured under heating for example at 68° C. for 30 minutes.

By mixing apple together with potatoes such as sweet potato into the other mix materials, to a final solid ice creams content in the total ice creams, preferably up to 25% to 34%, more preferably up to 28% to 31%, a smooth and creamy texture like ice cream can be brought about, which has never been realized yet.

Still more preferably, addition of an additive from at least one species of fruit with sourness as a raw material allows the exertion of the masking effect of soybean odor. For example, appropriate volumes of 100% Japanese apricot juice, lemon and apple may satisfactorily be used. Heating of the acids contained in such fruit along with soymilk causes protein modification, leading to the exertion of an emulsifying effect. For example, the emulsifying effect can be exerted by heating at a temperature of 68° C. for 30 minutes.

As other mix materials, further, appropriate amounts of beet granulated sugar, isomerized sugar, apple pectin, coral, vegetable oil such as sesame seed oil, rapeseed oil or perilla oil is used. For example, isomerized sugar at 10% to 15%, apple pectin at 0.02% to 0.05%, coral at 0.2% to 0.5% vegetable oil such as sesame seed oil, rapeseed oil or perilla oil at 0.4% to 1.2% are exemplified for use.

Additionally, addition of antioxidants, for example SOD, of vegetables or cereals including soybean and germ, or peptide or amino acid from fishes may possibly permit the exertion of an effect as a so-called functional food. The added level is exemplified as 0.08% to 2%.

Still further, the sweetener may satisfactorily be a naturally occurring or artificial sweetener with high calories, but a low-calorie sweetener such as momordicae fructus may also be used. As described above, the ice creams of the invention absolutely never contain any dairy product, so the ice creams are free of milk fat and with low calories. The level of momordicae fructus to be added is exemplified as 2% to 5%.

Further, appropriate use of various vegetables such as various vegetables such as sweet potato or ground green tea or cocoa or vanilla essence from natural origins allows the enjoyable taste of various flavors.

In accordance with the invention, thus, novel ice creams with a taste and a flavor without any soybean odor and with a smooth and creamy texture like ice cream can be recovered from the raw materials soybean and potatoes, with absolutely no use of dairy products or chemical auxiliaries for food, such as emulsifiers. Owing to the absolutely no use of dairy products or chemical auxiliaries such as emulsifiers, the resulting novel ice creams of the invention can be ingested even by persons with milk allergy or in delicate health, who could never taste ice cream. Additionally because of no use of rice, persons with rice allergy can ingest the novel ice creams of the invention.

Herein, milk may satisfactorily be used so as to satisfy the taste of consumers. In this case, ice cream products are produced, when the milk solid content is 15.0% or more and the milk fat content is 8.0% or more, while ice milk products are produced when the milk solid content is 10.0% or more and the milk fat content is 3.0% or more; and lacto-ice products are produced when the milk solid content is 3.0% or more.

As described above, all the materials used are beneficial for human bodies, so the smooth and creamy profile is comparable to the previous ice cream as a dairy product; additionally, nutritious elements never ingestible from dairy products, for example lecithin, calcium, potassium, vitamin B1, vitamin B2, iron, protein and isoflavone can be ingested, so that the resulting ice creams are suitable for the current health-conscious need.

EXAMPLES

One example of the composition of the ice creams of the invention is described below.

Provided that the total solid of the ice creams is defined 100 parts by weight, content ratios in a specific product are shown on a dry weight basis.

Total solid content in the ice creams: 29.0 parts by weight:
soymilk (solid product): 4.66 parts by weight;
sweet potato: 3.46 parts by weight;
oligosaccharide: 8.86 parts by weight;
apple: one part by weight;
additive from a raw material sour fruit (lemon): 0.02 part by weight;
isomerized sugar: 10.1 parts by weight;
apple pectin: 0.07 part by weight;
coral: 0.38 part by weight;
sesame seed oil: 0.58 part by weight;
vanilla essence: 0.05 part by weight.

One example of the specific method for producing the ice creams of the aforementioned composition will be described below.

After soybean was soaked in water for about 6 hours, soybean was boiled in water of a volume about 5-fold the volume of soybean at a temperature of 80° C. for 10 minutes until water slopped over, and then, lye was removed. The process was carried out twice in total, to remove fresh green odor of soybean. Additional water was charged while the temperature was elevated to about 80° C.; after grinding, juice with reduced fresh green odor was squeezed out at a pressure about half of general pressure, namely 100 kg/$^2$, so that soymilk was thereby recovered. Herein, the solid concentration in the squeezed soymilk juice is preferably 9 to 14%, more preferably about 11%. Further, the fresh green odor of the soymilk herein recovered was reduced to 70% to 80% of that of previous soymilk.

In place of the method, further, soymilk can be recovered by grinding soybean after allowing water to slop over to remove lye and subsequently supplementing water for boiling and filtration.

By an alternative method, domestic soybean is used in case of grinding soybean for subsequent boiling, to recover squeezed juice with reduced fresh green odor at 100 kg/m$^2$ about half of general pressure and thereby recover soymilk.

Into the solid content of the soymilk are kneaded sweet potato powder in a dry state at 3.46%, apple powder at 1%, oligosaccharide at 8.86%, lemon at 0.02%, isomerized sugar at 10.1%, apple pectin at 0.07%, coral at 0.38%, sesame seed oil at 0.58% and a flavor vanilla essence at 0.05%, all percentages being expressed on a dry weight basis, to adjust the solid content to 30.0% of the entirety.

Heating and agitation at a temperature of 68° C. for 30 minutes were conducted for sterilization in a pasteurizer. Soybean odor was eliminated, while protein modification was induced, leading to the exertion of the emulsifying effect.

Subsequently, filtration was carried out for homogenization (homogenize).

Then, the temperature was cooled from 68° C. to 5° C. over 5 minutes, for aging.

After final freezing, creamy ice creams were recovered.

The ice creams recovered at the aforementioned process had a taste and a flavor without any soybean odor as well as a smooth and creamy texture, like ice cream, irrespective of absolutely no use of any dairy products or chemical auxiliaries for food.

Owing to absolutely no use of dairy products or chemical auxiliaries such as emulsifiers, allergic reactions never occurred even in persons with milk allergy or in delicate health after ingestion of the resulting novel ice creams.

INDUSTRIAL APPLICABILITY

In accordance with the invention, thus, novel ice creams with a taste and a flavor with no soybean odor and with a smooth and creamy texture like ice cream can be recovered from the main raw materials soybean and potatoes, with no use of any dairy product or chemical food auxiliaries such as emulsifiers. Owing to the absolutely no use of dairy products or chemical auxiliaries such as emulsifiers, the resulting novel ice creams of the invention can be ingested even by persons with milk allergy or in delicate health, who could never taste ice cream. Additionally because of no use of rice, persons with rice allergy can ingest the novel ice creams of the invention.

As described above, because all the materials used are beneficial for human bodies, the smooth and creamy texture is comparable to the previous ice cream as a dairy product. Still further, nutritious elements never ingested from dairy products, for example lecithin, calcium, potassium, vitamin B1, vitamin B2, iron, protein and isoflavone can be ingested from the resulting ice creams, so the ice creams are suitable for the current health-conscious need.

What is claimed is:

1. A method for producing ice creams, including the steps of:

purifying soymilk by squeezing or filtering out soybean juice;

kneading at least one species of potato powder into the purified soymilk, for thermal treatment;

adding a sweetener;

mixing the purified soymilk that has been kneaded into the at least one species of potato powder and the sweetener; and subsequently cooling and freezing the mixture.

2. A method for producing ice creams according to claim 1, where the method includes a step of boiling soybean until water slops over and cooking soybean in water containing electrolytes or in alcohol and water prior to a step of squeezing out soybean juice.

3. A method for producing ice creams according to claim 1, where the method includes using sweet potato powder as at least one species of potato powder and using oligosaccharide as the sweetener.

4. A method for producing ice creams according to claim 3, where the method includes a step of additionally kneading at least one species of apple powder together with sweet potato powder into the solid of the soymilk.

5. A method for producing ice creams according to claim 4, where blend ratios to the total solid of the ice creams on a dry weight basis are 10 to 21% of soymilk, 5 to 12.5% of sweet potato powder, 1 to 2% of apple powder, and 20 to 40% of oligosaccharide.

6. A method for producing ice creams according to claim 3, where the mixing after the addition of oligosaccharide as the sweetener is carried out to decompose the sugar chain to increase the quantity of dextrin until the molecules causing soybean odor are incorporated therein.

7. A method for producing ice creams according to claim 1, where an additive from at least one species of fruit with sourness as a raw material is further added at the step of purifying soymilk.

8. A method for producing ice creams according to claim 7, where the method includes adding an additive from at least one species of fruit with sourness as a raw material and subsequently heating the mixture, including the additive, to induce protein modification for emulsification.

9. A method for producing ice creams according to claim 1, where the method includes further mixing at least one selected from beet granulated sugar, isomerized sugar, apple pectin, coral and vegetable oil as a mix material.

10. A method for producing ice creams according to claim 1, where at least one species of antioxidants of vegetables or cereals, and peptide or amino acid from fishes is added as a material to be added, together with the mix materials.

11. A method for producing ice creams according to claim 1, where milk is used as a mix material.

* * * * *